United States Patent
Polanich

(10) Patent No.: US 10,079,524 B1
(45) Date of Patent: Sep. 18, 2018

(54) RAILROAD POWERED ENERGY RECOVERY SYSTEM

(71) Applicant: Jerry W. Polanich, Davis, CA (US)

(72) Inventor: Jerry W. Polanich, Davis, CA (US)

( * ) Notice: Subject to any disclaimer, the term of this patent is extended or adjusted under 35 U.S.C. 154(b) by 5 days.

(21) Appl. No.: 15/594,196

(22) Filed: May 12, 2017

Related U.S. Application Data

(60) Provisional application No. 62/335,304, filed on May 12, 2016.

(51) Int. Cl.
| | | |
|---|---|---|
| *H02K 7/18* | (2006.01) | |
| *F04B 35/01* | (2006.01) | |
| *F04B 41/02* | (2006.01) | |
| *F04B 41/06* | (2006.01) | |
| *F04B 39/00* | (2006.01) | |

(52) U.S. Cl.
CPC .......... *H02K 7/1815* (2013.01); *F04B 35/01* (2013.01); *F04B 39/0005* (2013.01); *F04B 41/02* (2013.01); *F04B 41/06* (2013.01)

(58) Field of Classification Search
CPC ... H02K 7/1815; F04B 35/01; F04B 39/0005; F04B 41/02; F04B 41/06
USPC .......................................................... 290/1 R
See application file for complete search history.

(56) References Cited

U.S. PATENT DOCUMENTS

| | | | | |
|---|---|---|---|---|
| 6,376,925 B1* | 4/2002 | Galich | ...................... | F03G 7/08 290/1 R |
| 7,530,760 B2* | 5/2009 | Rastegar | ................. | E01C 9/007 290/1 R |
| 8,334,603 B2* | 12/2012 | Daya | ........................ | B61C 3/00 290/1 C |
| 8,754,539 B2* | 6/2014 | Black | ...................... | F04B 35/00 290/1 R |
| 2007/0085342 A1* | 4/2007 | Horianopoulos | ......... | F03G 7/08 290/1 R |
| 2008/0224477 A1* | 9/2008 | Kenney | ................... | F01D 17/26 290/1 R |
| 2012/0274079 A1* | 11/2012 | McCoy | ................ | H02K 7/1823 290/1 R |
| 2012/0299310 A1* | 11/2012 | McBride | ............... | F15B 11/032 290/1 R |

FOREIGN PATENT DOCUMENTS

EP 0046199 A1 2/1985

* cited by examiner

*Primary Examiner* — Viet Nguyen
(74) *Attorney, Agent, or Firm* — Temmerman Law Office; Mathew J. Temmerman

(57) ABSTRACT

A railroad powered energy recovery system and method comprising a plurality of air compressor units, a plurality of pipelines, at least one check valve, an air filter, a motor-generator set, at least one pressure regulator valve, a first storage means, a second storage means and a booster amplifier, wherein the plurality of pipelines is configured to connect each of the plurality of air compressor units attached to an inner side of each of the rails of an existing railroad system. The plurality of air compressor units produces compressed air when a train traverses over them. The at least one check valve is configured to assure consistent direction of air flow through the plurality of pipelines. The motor-generator set converts compressed air into electricity and the remaining compressed air is stored in the first storage means. The second storage means stores highly compressed air produced from the booster amplifier.

18 Claims, 7 Drawing Sheets

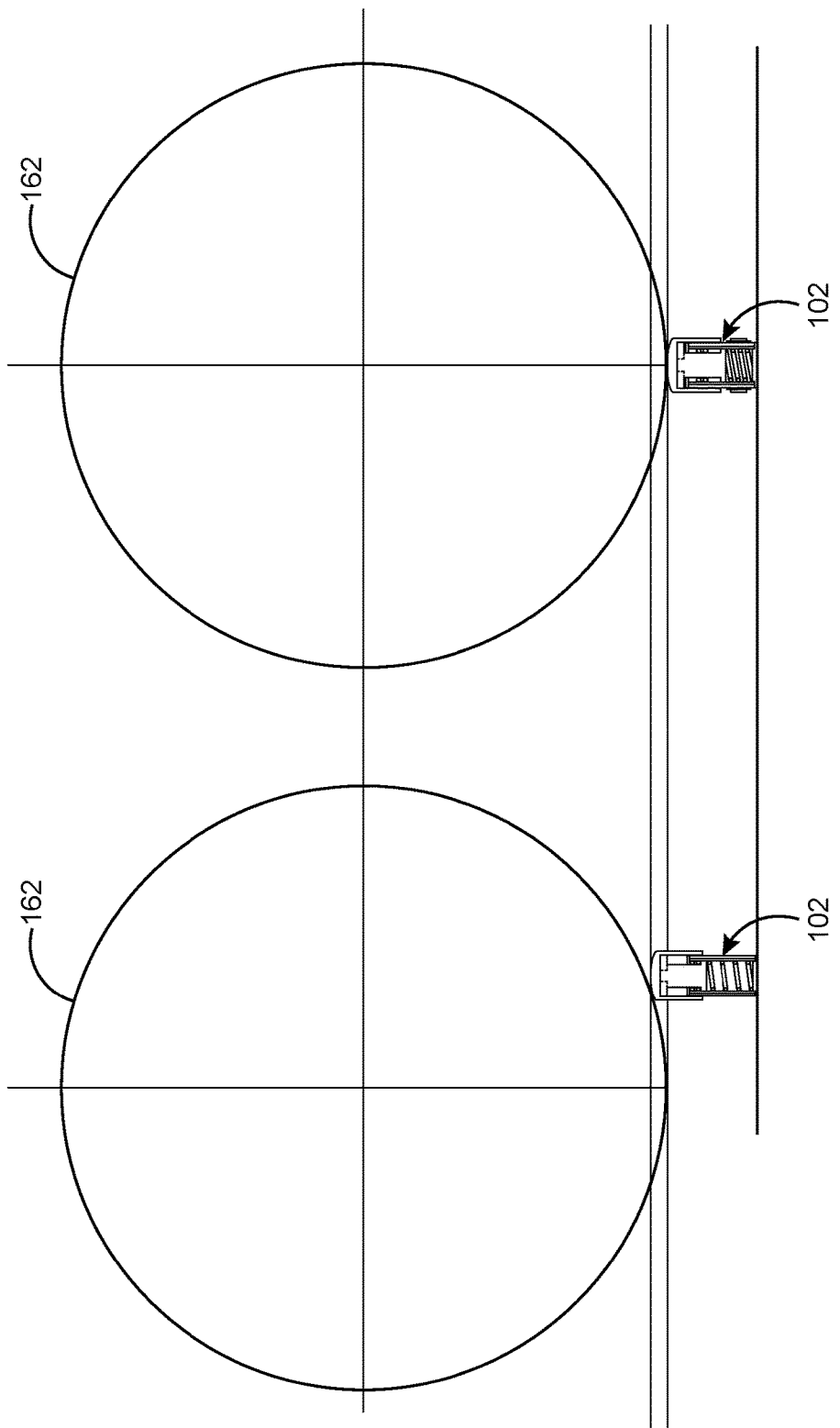

RAILROAD POWERED ENERGY RECOVERY SYSTEM

RELATED APPLICATIONS

This application claims priority from the U.S. provisional application with Ser. No. 62/335,304 and filed May 12, 2016, the disclosure of which is incorporated herein as if set out in full.

BACKGROUND OF THE DISCLOSURE

Technical Field of the Disclosure

The present embodiment relates in general to power generating systems associated with rail vehicles and, in particular, to a dynamic high energy force transfer system as a part of a railroad powered energy recovery system to produce a large volume of compressed air for many uses, among them to generate electricity.

Description of the Related Art

Nearly all of modern society relies on energy, and while most is electric, the energy sources are myriad from which modern industrial electricity is derived. One generally unexpected but highly functional source for storing energy is compressed air. Pneumatic systems use compressed air as energy storage and as a medium for operation, however, compressor units employed to produce compressed air for energy storage are generally rated to draw specific levels of electrical current from the electrical circuits to which they are connected during their operation. Thus, it would not typically be efficient or economical to employ air compressors unless they do not require electrical energy for their operation. Moreover, the volume of compressed air thus produced is less when compared with the cost of electrical energy utilized and hence does not typically meet full operating scale volume demand. Some other compressor units are gas or diesel powered which while useful, discharge hydrocarbons or other harmful byproducts into the atmosphere.

Batteries, generators, and the like provide electrical energy to satisfy electrical energy requirements. However, each of these sources has its own disadvantages. For example, batteries are heavy and have limited operational life. Generators are expensive and require fossil fuel for operation. Further, they release harmful gases and pollute the environment. Traditional coal or natural gas power plants employed for generating electricity produce tons of carbon dioxide and a variety of other unhealthy particulate emissions. Electrical energy can be generated from renewable resources which are not subject to depletion in a human timescale. However, with renewable energy sources it is difficult to generate the large quantities of electricity when the demand for electricity surges. Another drawback to these renewable energy sources is the reliability of supply. Renewable energy normally relies on the weather, particularly sun and wind for its source of power. This can be unpredictable and inconsistent. The current cost of renewable energy technology is also relatively high, although dropping. Many methods and systems have been proposed to generate electrical power by harnessing existing natural forces.

A system that would produce large volumes of compressed air may be able to solve some of the above shortfalls. Such a system is a railroad-powered energy recovery system that would employ a number of air compressor units to deliver compressed air directly to industrial purposes or for electricity generation. Such a system would be adaptable to apply large volumes of compressed air to power a pneumatic system and to generate electricity. This system would provide additional revenues to the existing railroads and could replace many fossil fuel power plants. Such a system would provide a reliable supply of compressed air and electricity depending on the demand. This system would produce electricity without discharging any harmful byproducts into atmosphere. This system would produce highly compressed air that can be stored for extended lengths of time and used for industrial purposes. It would provide clean and sustainable energy flexible to demand and would be fuel and cost effective. The present embodiment overcomes the existing shortcomings in this area by accomplishing these objectives.

SUMMARY OF THE DISCLOSURE

To minimize the limitations found in the existing systems and methods, and to minimize other limitations that will be apparent upon the reading of this specification, the preferred embodiment of the present invention provides a dynamic high energy force transfer system as a part of an energy recovery system. The dynamic high energy force transfer system is a railroad powered energy recovery system that produces a large volume of compressed air and generates electricity utilizing the compressed air.

The system comprises a plurality of air compressor units, a plurality of pipelines, at least one check valve, an air filter, a motor-generator set, at least one pressure regulator valve, a first storage means and a second storage means. The plurality of air compressor units is attached to an inner side of each of the rails of a railroad. The plurality of pipelines connects the plurality of air compressor units along the length of the rail which includes an air inlet at one end and an air outlet at another end. The air filter is attached to the air inlet of the plurality of pipelines. The air filter captures free air from the atmosphere and supplies it to at least one of the plurality of air compressor units.

The air compressor unit comprises an outer casing, a piston assembly, a piston retaining member, a piston transition member, a piston liner member and at least one elastic member. The outer casing of the air compressor unit includes a lower member attached to an upper protective member to form an enclosed casing, an inlet and an outlet. The lower member has an upper end and a lower end. The inlet and the outlet of the air compressor unit are configured to transfer air into and out of the air compressor unit. The piston assembly is positioned inside the outer casing and is adaptable to move upward and downward. The piston assembly includes a piston having a piston head and a piston shaft, a biasing member, a piston separation member and a piston cylindrical sleeve. The piston retaining member is attached to the upper end of the lower member to create an opening. The piston retaining member is configured to retain the piston head within the piston cylindrical sleeve. The piston separation member is positioned inside the piston cylindrical sleeve, between the piston and the piston cylindrical sleeve to prevent the piston head from hitting the piston retaining member. The piston shaft is attached to the protective member through the piston transition member.

When a train traverses over the plurality of air compressed unit, compressed air is produced in the plurality of pipelines. At least one check valve is positioned on each of the plurality of pipelines between two adjacent air compressor units to assure the flow of air in a single direction. The compressed air forced to the air outlet of the energy recovery system. One end of a "T" connection attached to the air outlet of the system supplies compressed air to the motor-generator set. The remaining compressed air can be stored in the first storage means through the other end of the "T" connection. The booster amplifier is connected to the first storage means and supplied with compressed air stored in the first storage means and produces higher pressure compressed air which is stored in the second storage means.

A method for generating electricity utilizing a railroad powered energy recovery system comprises the steps of: providing the railroad powered energy recovery system having a plurality of air compressor units, a plurality of pipelines, at least one check valve, an air filter, a motor-generator set, a first storage means, a second storage means and a booster amplifier. Installing the plurality of air compressor units on the inner side of the rails of the existing railroad system and interconnecting each of the plurality of air compressor units by means of the plurality of pipelines. Then, providing free air into the plurality of air compressor units by an air filter positioned on at least one of the plurality of pipelines through an air inlet. Compressing the air on each of the plurality of air compressor units by the wheel of the train as the train traverses over them to produce compressed air and pushing the compressed air through the plurality of pipelines to an air outlet on at least one of the plurality of pipelines. Then providing the compressed air to the motor-generator set connected at the air outlet through a T connection and generating electricity from the compressed air by the motor-generator set. The remaining compressed air is stored in the first storage means and can be used for industrial purposes. Finally, storing highly-compressed air produced by the booster amplifier in the second storage means.

It is a first objective of the present invention to provide a system that produces large volumes of compressed air.

A second objective of the present invention is to provide a system that generates electricity from the compressed air.

A third objective of the present invention is to provide a system that employs a plurality of air compressor units on existing railroads to produce compressed air.

A fourth objective of the present invention is to provide a system that replaces fossil fuel power plants and provides additional revenues from existing railroads.

Another objective of the present invention is to provide a system that provides a reliable supply of compressed air and electricity depending on the demand.

Yet another objective of the present invention is to provide a system that produces electricity without discharging any harmful byproducts into the atmosphere.

Still another objective of the present invention is to provide a system that provides clean and sustainable energy depending on demand which is fuel and cost effective.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

FIG. 5 illustrates a schematic diagram of the air compressor unit attached to the rail of the railroad in a fully recoiled position and a fully compressed position as the wheel of the train passes over the air compressor unit in accordance with the present invention.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about" means +/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Figure 1:
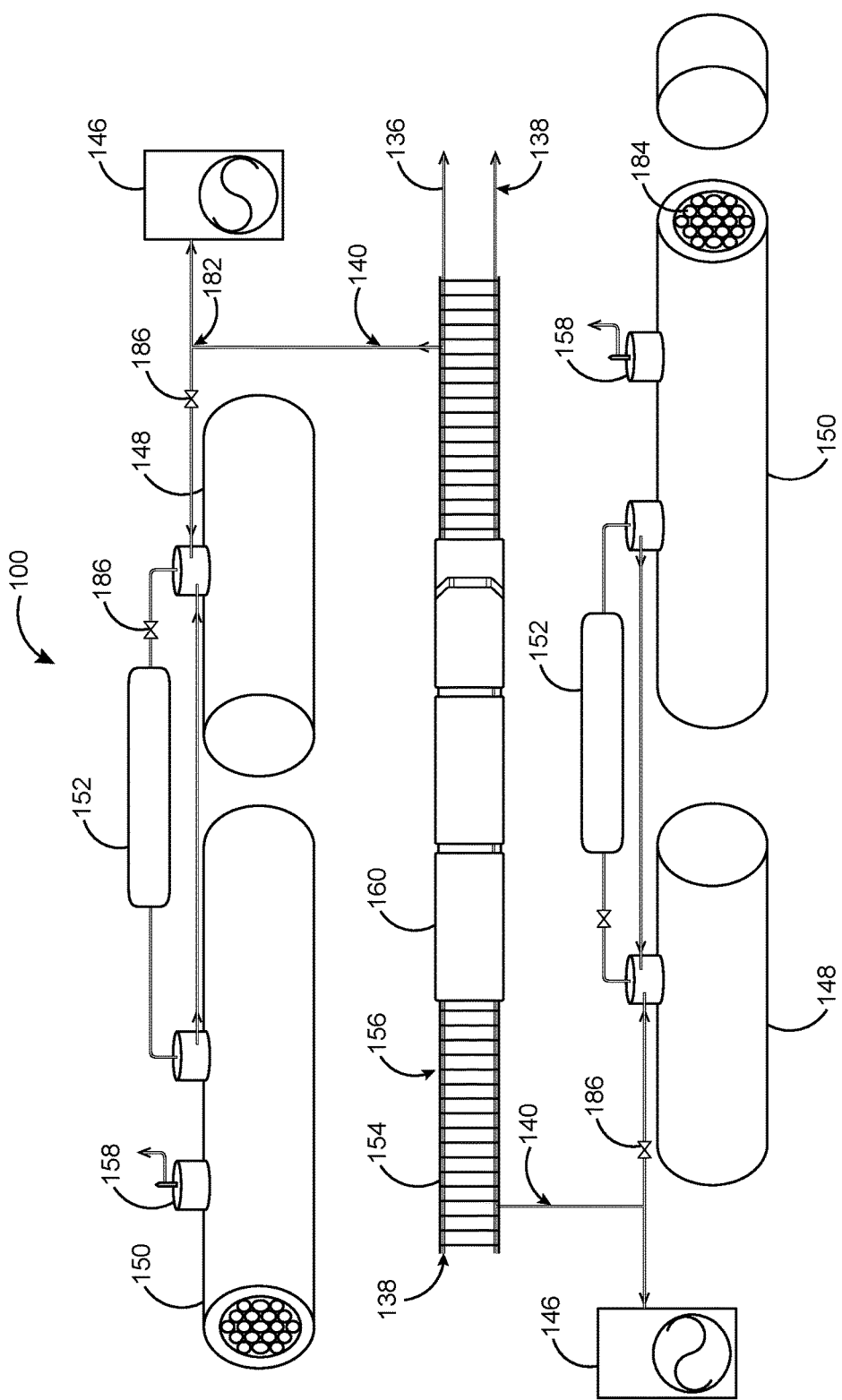
FIG. 1 illustrates a schematic diagram of a railroad powered energy recovery system layout in accordance with the present invention.

Turning first to FIG. 1, a schematic diagram of a railroad powered energy recovery system 100 is illustrated. The railroad powered energy recovery system 100 is particularly adapted to be integrated with existing rails 154 of the railroad 156. The present system 100 produces large volumes of compressed air and this compressed air is utilized to generate electricity. The present system 100 can be installed on rails 154 of the railroad 156, without causing any interference to their normal operation. This system 100 utilizes the energy of a train 160 in motion to produce a clean and sustainable energy supply on demand. The system 100 of the present invention replaces the usage of fossil fuels and eliminates the discharge of hydrocarbons or other harmful byproducts into the atmosphere. The system 100 converts mass weight in motion using pneumatic components with greater efficiency to produce highly compressed air. The compressed air is utilized for distinctly different applications like, a source for pneumatic systems in industrial applications and generating electricity from the compressed air.

The present system 100 provides an efficient supply of compressed air directly to the industrial user at a full operating scale volume and according to demand needs on site. The present system can economically provide mega-cubic feet supply of compressed air from the large underground storage units. The system 100 can also produce "Utility Scale Electricity" when it is exclusively connected to a national grid system.

The railroad powered energy recovery system 100 comprises a plurality of air compressor units 102, a plurality of pipelines 136, at least one check valve 142, an air filter 144, a motor-generator set 146, at least one pressure regulator valve 186, a first storage means 148 and a second storage means 150. The rail 154 of the existing railroad 156 is positioned over a number of tie plates (not shown) and held in position utilizing a number of couplings each having an inside bracket (not shown) and an outside bracket (not shown). The rails 154 thus connected using the inside bracket and the outside bracket creates a gap therebetween.

Figure 4:
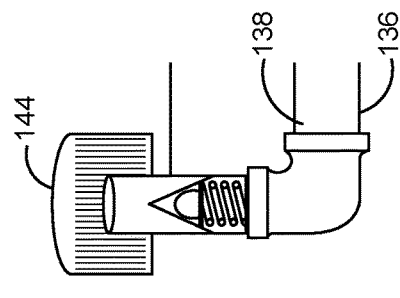
FIG. 4 illustrates an air filter attached to a pipeline of the railroad powered energy recovery system in accordance with the present invention.

The plurality of air compressor units 102 is attached to the inner side of each of the parallel rails 154 of the existing railroad 156 utilizing an attachment means 172. The attachment means 172 includes a channel bracket connector adapter 174 and a mounting channel iron connector 176. The channel bracket connector adapter 174 fits into the mounting channel iron connector 176 which is attached to the air compressor unit 102. One end of the channel bracket connector adapter 174 is then inserted into the gap formed between the rail 154 and the inside bracket on inner side of the railroad 156 and is held firmly. The plurality of air compressor units 102 is arranged in series along the length of the rail 154 and positioned adjacent the rail head 178 and placed over the rail base 180. The plurality of air compressor units 102 is arranged such that when the train 160 traverses over it, the train wheel flange touches the top of the air compressor units, push it downwards and compress the air compressor units 102. Each of the plurality of air compressor units 102 is interconnected by means of the plurality of pipelines 136. The plurality of pipelines 136 is configured to provide a path for the passage of air into and out of the air compressor unit 102. Each of the plurality of pipelines 136 is attached to each of the plurality of air compressor units 102 utilizing a pipe support mount plate 164. The pipe support mount plate is preferably made of steel. The plurality of pipelines 136 can preferably be ¾" galvanized steel pipe with a pressure rating not less than 700 psi. Appropriate air tight pipe joining methods that could include, tig joint welds prevent air leaks. The plurality of pipelines 136 connects the plurality of air compressor units 102 along the length of the rail 154. At least one of the plurality of pipelines 136 includes an air inlet 138 at one end and an air outlet 140 at another end. The air inlet 138 allows free air to enter into the pipeline 136 and the air outlet 140 forces the compressed air to flow out only in one restricted direction through the pipeline, regardless of the direction from which each cause of actuation event comes. The air filter 144 (see FIG. 4) is attached to the air inlet 138 of the plurality of pipelines 136. The air filter 144 as illustrated in FIG. 4 captures free air from the atmosphere and supplies it to the plurality of air compressor units 102. The function of the plurality of air compressor units 102 is to provide compressed air. The free air entering the pipeline 136 through the air filter 144 is passed through each of the plurality of air compressor units 102 and compressed air is produced from each of the plurality of air compressor units 102. The plurality of air compressor units 102 produces an accumulation of compressed air when a set of train wheels traverses over each one of them. The at least one check valve 142 positioned on each of the plurality of pipelines 136 between two adjacent air compressor units 102 is configured to assure a consistent direction of air flow. The at least one check valve 142 is designed to allow air to flow in one direction and prevents it from flowing in the opposite direction. The compressed air thus produced from the series connected plurality of air compressor units 102 can be obtained from the air outlet 140. A fully assembled stretch of the present system 100, for example, includes as long as 100 uninterrupted miles of joined and mounted pipelines 136 with the plurality of air compressor units 102 having alternating check valves 142 between them. Appropriate air tight pipe joining methods and best materials are employed to prevent leakage of the compressed air and include methods like, but not limited to, tig joint welds.

The present system 100 produces large volumes of compressed air at the air outlet 140 of the at least one of the plurality of pipelines 136. This system 100 utilizes the energy of a train 160 in motion to produce a clean and sustainable energy supply on demand. For example, the present system 100 when used to power a bank of pneumatic motor-generator sets, after installing them on a proposed 10 miles of railroad has the potential to produce an electrical energy capacity output of more than 872 MW on a 24/7 basis when a typical number of trains are in motion.

The pressure of the compressed air produced at the air outlet 140 can preferably be about 700 psi, although other amounts may be generated without departing from the invention. The metal strength and flexibility characteristics of the plurality of pipelines 136 and the check valve 142 are such that they can withstand maximum high anticipated air pressure without damage.

The compressed air from the air outlet 140 of the system passes through a "T" connection 182 attached to it. One end of the T connection 182 is connected to the motor-generator set 146 and the other end of the T connection 182 is attached to the first storage means 148. The compressed air is thus supplied to the motor-generator set 146 attached to the air outlet 140 of the at least one of the plurality of pipelines 136. The motor-generator set 146 is preferably a pneumatic motor-generator set which is configured to generate electricity from compressed air. The remaining compressed air from the other end of the T connection 182 can be stored in the first storage means 148 as illustrated in FIG. 1. Higher pressure and even more compressed air can be produced by employing a booster amplifier 152. The booster amplifier 152 is connected between the first storage means 148 and the second storage means 150. The booster amplifier 152 is preferably an in-line booster series amplifier, for example, that converts compressed air having a pressure of 700 psi to a highly-compressed air having a pressure of 70000 psi. The compressed air from the first storage means 148 is supplied to the booster amplifier 152, which produces a higher pressure compressed air and is stored in the second storage means 150. The first storage means 148 and the second storage means 150 are uniquely designed for the safe storage of highly compressed air and are capable of supplying the least expensive and efficient source of compressed air to the nearby industrial users for their pneumatic industrial operations. The plurality of pipelines 136 employed to transfer compressed air to and from the first storage means 148 and the second storage means 150 is especially designed with a number of safety features. Various control devices such as, but not limited to, the pressure regulator valve 186 and a safety relief valve 158 are employed to balance the pressure and to regulate the volume of the compressed air in the first storage means 148 and the second storage means 150. The pressure regulator valve 186 is, preferably, set at 700 psi. The safety relief valve 158 is, preferably, set at 72000 psi. The first storage means 148 and the second storage means 150 can be pre-stressed concrete casing. Each of the first storage means 148 and the second storage means 150 has for example, a plurality of well casings 184. The first storage means 148 and the second storage means 150 are trenched wide and deep enough to fit the casing 184, adjacent and along each side parallel to the system installed rail. The first storage means 148 is the main storage unit having a capacity of, for example, 479 cubic feet per minute (CFM) capacity output at 700 psi for one hour. The second storage means 150 is a long-term storage unit having a capacity of, for example, 1,977,659 cubic feet per minute (CFM) capacity output at 700 psi for one day. The second storage means 150 may include a plurality of well casings bundled in a pre-stressed concrete sewer pipe.

Figure 2A:
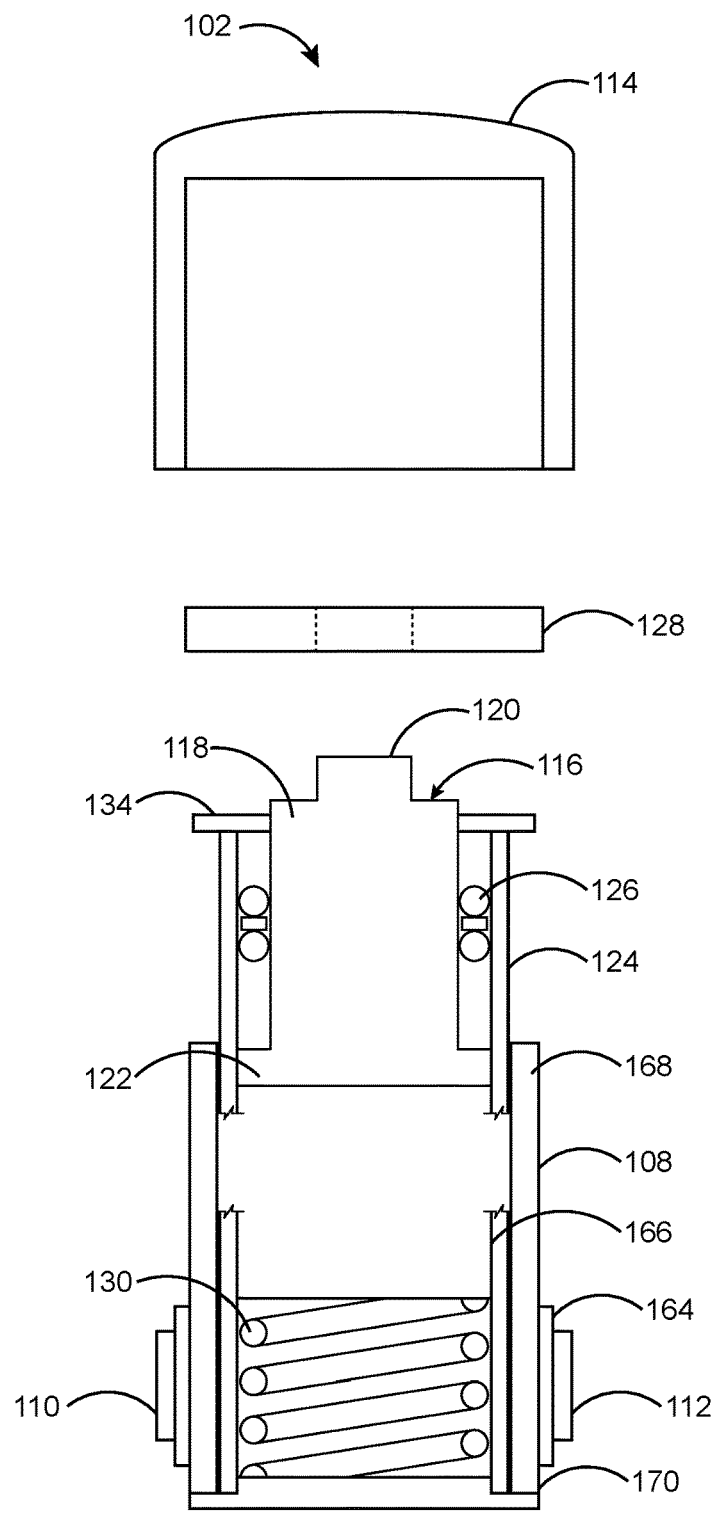
FIG. 2A illustrates an exploded view of an air compressor unit of the railroad powered energy recovery system in accordance with the present invention.
Figure 2D:
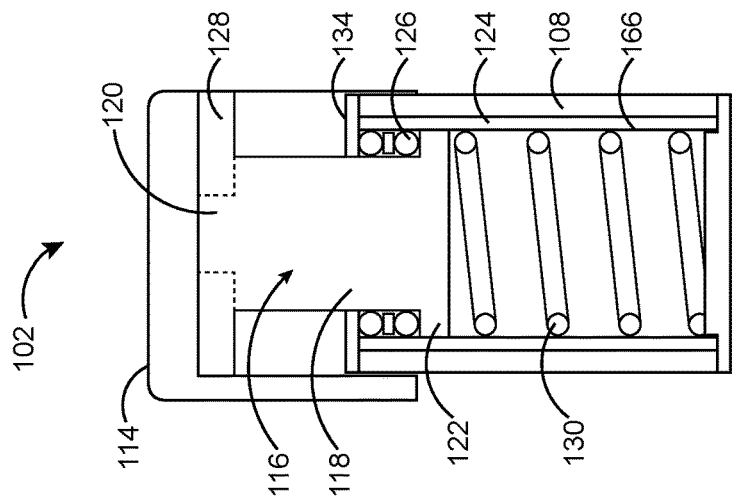
FIG. 2D illustrates a right side cross-sectional view of the air compressor unit in a fully recoiled position in accordance with the present invention.
Figure 2C:
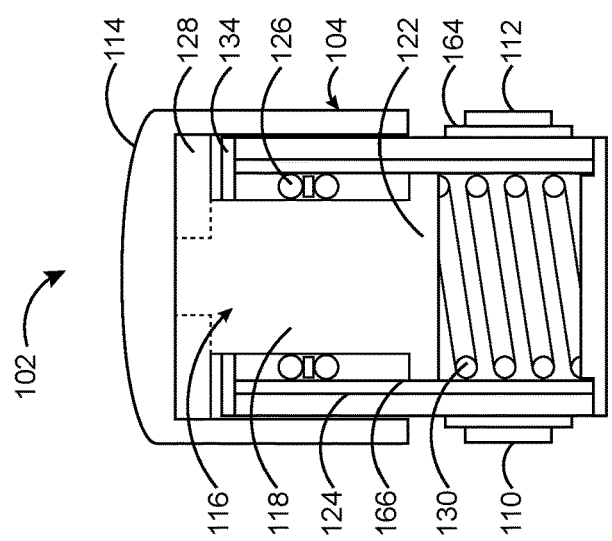
FIG. 2C illustrates a front cross-sectional view of the air compressor unit in a fully compressed position in accordance with the present invention.
Figure 2B:
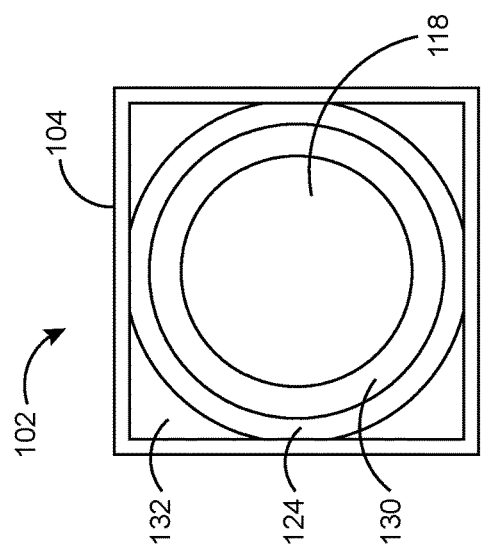
FIG. 2B illustrates a top cross-sectional view of the air compressor unit in accordance with the present invention.

Referring to FIGS. 2A-2D, an exploded view of the air compressor unit 102 of the railroad powered energy recovery system 100 is illustrated in FIG. 2A. The air compressor unit 102 comprises an outer casing 104, a piston assembly 116, a piston retaining member 134, a piston transition member 128, a piston liner member 124 and at least one elastic member 132. The outer casing 104 of the air compressor unit 102 includes a lower member 108 attached to an upper protective member 114 to form an enclosed casing, an inlet 110 and an outlet 112. The lower member 108 has an upper end 168 and a lower end 170. The inlet 110 and the outlet 112 of the air compressor unit 102 are configured to transfer air into and out of the air compressor unit 102. The inlet 110 allows free air to enter into the air compressor unit 102 and the outlet 112 forces compressed air to flow from the air compressor unit 102. The upper protective member 114 provides protection to the air compressor unit 102. The protective member 114 can be preferably a rubber cushioned dust control cap. The piston assembly 116 is positioned inside the outer casing 104 and is adaptable to move upward and downward. The piston assembly 116 includes a piston 118 having a piston head 122 and a piston shaft 120, a biasing member 130, a piston separation member 126 and a piston cylindrical sleeve 166. The piston assembly 116 is positioned inside the lower member 108 of the outer casing 104. The piston retaining member 134 is attached to the upper end 168 of the lower member 108 to create an opening. The opening allows the piston 118 to move upwards and downwards when the piston 118 is in a recoiled and compressed state respectively. The piston retaining member 134 is configured to retain the piston head within the piston cylindrical sleeve 166. The piston separation member 126 is positioned inside the piston cylindrical sleeve 166, between the piston 118 and the piston cylindrical sleeve 166 to prevent the piston head 122 from hitting the piston retaining member 134. The piston separation member 126 can preferably be two "0" rings with a separator ring. The piston shaft 120 is attached to the protective member 114 through the piston transition member 128. The piston 118 inside the outer casing 104 is capped with the protective member 114 which acts as an elastic force absorbing cover and also as a dust cover preventing foreign matter from inhibiting the free reciprocating motion between the piston 118 and the piston cylindrical sleeve 166. The piston transition member 128 is positioned above the piston assembly 116 to provide protection to the piston shaft 120 while the piston 118 moves upwards or downwards. The biasing member 130 is attached to the piston head 122 and positioned inside the piston cylindrical sleeve 166. The biasing member 130 creates a compressive force within the air compressor unit 102 and produces the compressed air. The biasing member 130 can preferably be a steel compression spring. The piston liner member 124 is positioned between the outer casing 104 and the piston cylindrical sleeve 166. The piston liner member 124 prevents friction between the outer casing 104 and the piston cylindrical sleeve 166. An elastic member 132 is positioned inside the air compressor unit 102 as illustrated in FIG. 2B. The elastic member 132 is positioned between the outer casing 104 and the piston liner member 124. FIG. 2C illustrates a front cross-sectional view of the air compressor unit 102 in a fully compressed position and a right side cross-sectional view of the air compressor unit 102 in a fully recoiled position is illustrated in FIG. 2D.

FIGS. 3A-3D illustrate different stages of operation of the railroad powered energy recovery system 100 illustrating the fully compressed and fully recoiled state of the air compressor unit 102 as a wheel 162 of the train 160 rolls over it. The railroad powered energy recovery system 100 generates electricity from compressed air. The plurality of air compressors units 102 are connected through the plurality of pipelines 136 with at least one check valve 142 between at least two adjacent air compressors units 102. The plurality of air compressors units 102 are attached to both the rails 154 of the railroad 156.

Figure 3B:
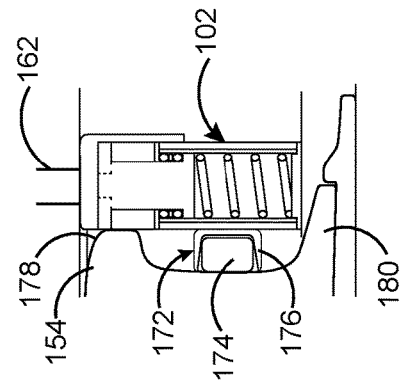
FIG. 3B illustrates a side view of the air compressor unit attached to the rail of a railroad in a fully recoiled position in accordance with the present invention.
Figure 3A:
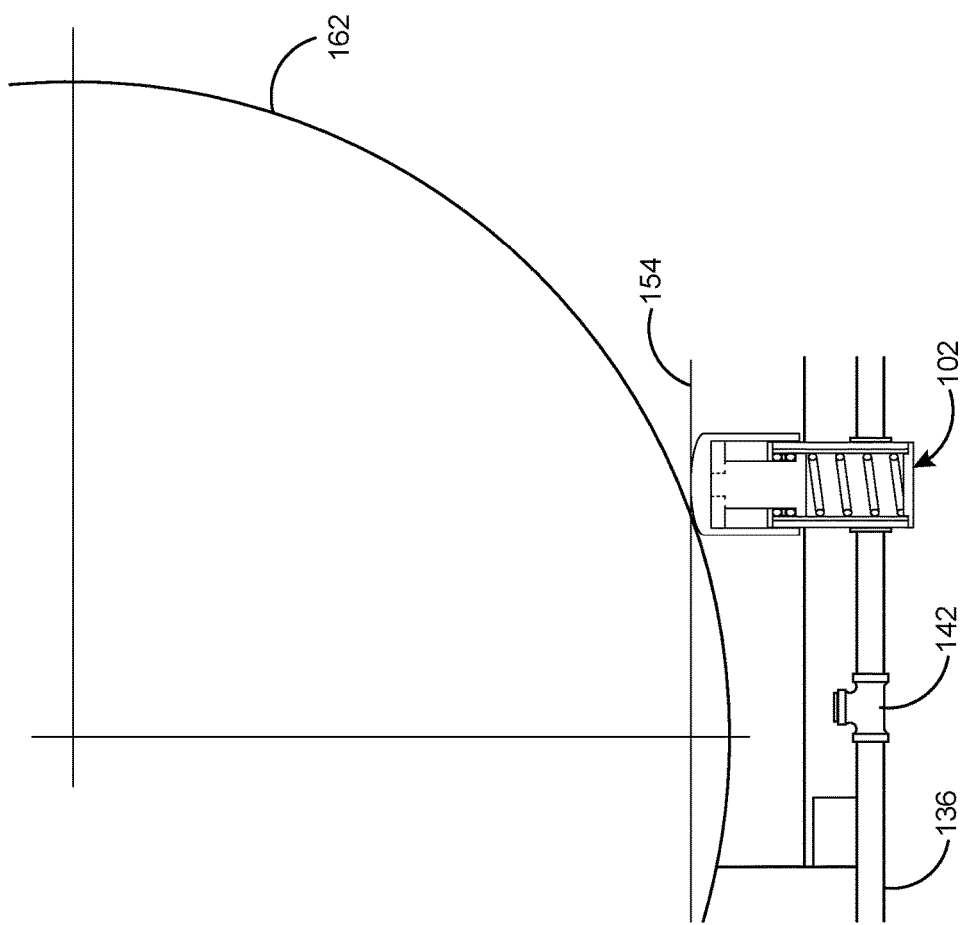
FIG. 3A illustrates a front view of the air compressor unit attached to the rail of the railroad in a fully recoiled position as a wheel of a train just touches the air compressor unit in accordance with the present invention.

In operation, as the train 160 moves over the rails 154 of the railroad 156, the wheel 162 of the train 160 touches the fully recoiled air compressor unit 102 as illustrated in FIG. 3A and begin to compress at least one of the plurality of air compressor units 102. A side view of the air compressor unit 102 in the fully recoiled position attached to the rail 154 of the railroad 156 is illustrated in FIG. 3B. The compression of each of the plurality of air compressor units 102 occurs during normal train trip operations and does not interfere with normal train operations.

Figure 3D:
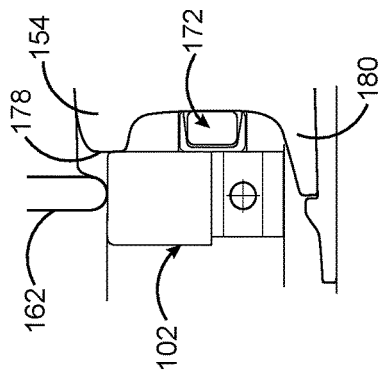
FIG. 3D illustrates a side view of the air compressor unit attached to the rail of the railroad in a fully compressed position as the wheel of the train passes over the air compressor unit in accordance with the present invention.
Figure 3C:
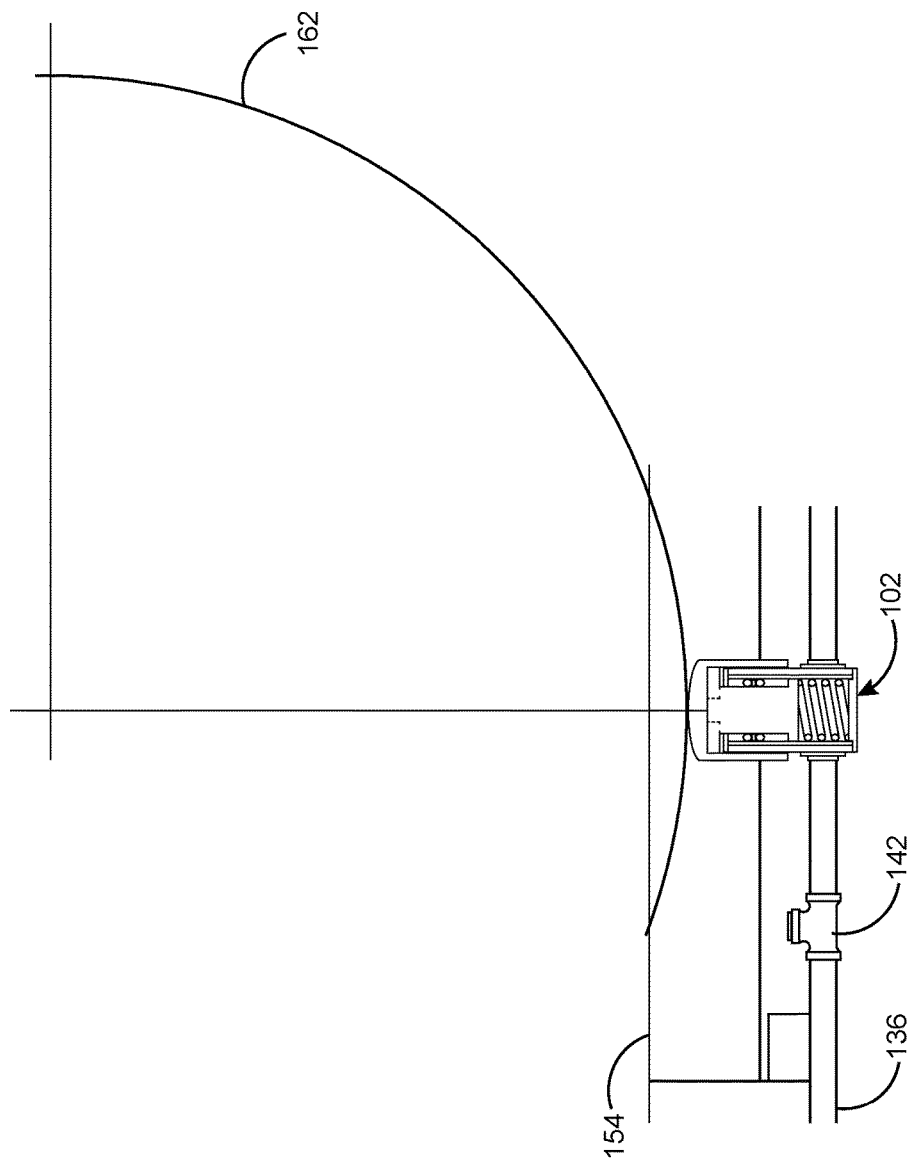
FIG. 3C illustrates a front view of the air compressor unit attached to the rail of a railroad in a fully compressed position as the wheel of the train passes over the air compressor unit in accordance with the present invention.

The compressive force applied on top of the air compressor unit 102 pushes the piston assembly 116 downwards and compress the air inside the air compressor unit 102. The compressed air thus produced inside the air compressor unit 102 is transferred through the outlet 112 of the air compressor unit 102 to at least one of the plurality of pipelines 136. This fully compressed position of the air compressor unit 102 is called the air exhaust stroke as illustrated in FIG. 3C, because the compressed air is pushed out of the of air compressor unit 102 into the plurality of pipelines 136. A side view of the air compressor unit 102 in the fully compressed position attached to the rail 154 of the railroad 156 is illustrated in FIG. 3D.

As the train 160 moves further forward, the wheel 162 leaves the air compressor unit making it to fully recoil, as illustrated in FIG. 3A, to the initial position. The spring action of the biasing member 130 allows the air compressor unit back to the fully recoiled state. The fully recoiled state of the air compressor unit 102 is called the air intake stroke. During this stroke, the air filter 144 (see FIG. 4) positioned at the air inlet 138 of the pipeline 136 supply free air into the air compressor unit 102 through the inlet 110.

When the wheels 162 of the train 160 rolls down the track, each of the wheels 162 will cause a constant volume contribution of compressed air relayed from one air compressor unit 102 to the check valve 142 and to other air compressor unit 102 again as they are being crossed. The volume of compressed air accumulates in the pipeline 136 with check valves 142 inserted between them one to the next in order to provide a continuous air flow in only one direction. In a preferred embodiment, each air compressor unit 102 compression stroke adds 3.5343 cubic inches of compressed air to the attached pipeline 136. Given that train cars will have various weights, the respective air compressor unit 102 under them will receive different transferred weight forces. This will result in a range of different psi value outputs from those air compressor units 102 that get translated into a range of different compressed out flow rates, while from one air compressor unit 102 to another. The volumes thus contributed to the pipeline 136 will remain constant from one to the next air compressor unit 102.

A continuous accumulation of compressed air is passed through each of the plurality of air compressor units 102 in relay fashion as the train 160 moves over them. The compressed air flows through the plurality of pipelines 136 connecting the plurality air compressor units 102 and can be collected from the air outlet 140 of the plurality of pipelines 136. The pressure of the compressed air collected from the air outlet 140 of the plurality of pipelines 136 can preferably be, about 700 psi.

Each air compressor unit 102 compression stroke adds 3.5343 cubic inches of compressed air to the attached pipeline 136. As one example, at the end of a typical one mile long train, there are 5,280 air compressor units 102 that will be compressed and produce 808*5,280*3.5343 cubic inches of compressed air volume to the pipeline. Each of the parallel rails have separated pipelines and doubles the volume per length of track which results as each wheel set rolls over two air compressor units 102 at a time.

The compressed air from the air outlet 140 of the system passes through the "T" connection 182 attached to it. One end of the T connection 182 is connected to the motor-generator set 146 and the other end of the T connection 182 is attached to the first storage means 148. The compressed air is thus supplied to the motor-generator set 146 attached to the air outlet 140 of the at least one of the plurality of pipelines 136. The motor-generator set 146 is preferably a pneumatic motor-generator set which is configured to generate electricity from compressed air. The remaining compressed air from the other end of the T connection 182 can be stored in the first storage means 148. Due to the one-way air flow direction controlled by the check valve's 142 orientation between each of the plurality of air compressor unit 102 large volumes of compressed air is pushed forward in a single direction and can be stored in the trenched underground first storage means 148. Further as the check valve 142 orientation allows only one way air flow, the system 100 can be employed efficiently even if the train is taking a forward trip or a return trip. The compressed air stored in the first storage means 148 can be utilized for working pneumatic systems. A highly-compressed air with a higher pressure can be produced by supplying the compressed air stored in the first storage means 148 through the booster amplifier 152 and can be stored in the second storage means 150. The booster amplifier 152 can preferably be a 700 psi to 70,000 psi compressed air booster self-actuating amplifier that aids discharge into the second storage means 150.

As high pressure is maintained in the second storage means 152, a higher compression ratio is maintained which means more volume of compressed air can be stored therein. Thus, the second storage means 150 can store a large volume range of air supply and can provide for long term use. The second storage means 150 has a redundant pair of safety valves 158 set at 72,000 psi to protect the pneumatic second storage means 150. In one embodiment, at least one pipeline 136 connects the second storage means 150 to the first storage means 148 via a control device (not shown) that opens and closes to create a loop back line control system feature. The control device can preferably be a combination of an inline 600 psi low pressure sensor and an automatic control valve. The control device (not shown) automatically assures that any demand for the delivery of compressed air to the motor-generator set 146 will have an as needed range of compressed air that controls the electrical output within a certain capacity.

FIG. 4 illustrates the air filter 144 attached to at least one of the plurality of pipelines 136 of the railroad powered energy recovery system 100 in accordance with the present invention. The air filter 144 is attached to the air inlet 138 of the plurality of pipelines 136. The air filter 144 captures free air from the atmosphere and supplies it to at least one of the plurality of air compressor units 102.

In one embodiment, a plurality of compressed air storage means 148 could be employed to store compressed air to produce electricity and designated for the exclusive supply of compressed air in accordance with the air demand needs.

FIG. 5 illustrates a schematic diagram of the air compressor unit 102 attached to the rail 154 of the railroad 156 in a fully recoiled position and a fully compressed position as the wheel 162 of the train 160 passes over the air compressor unit 102 in accordance with the present invention. A large volume of compressed air can be produced by installing the railroad powered energy recovery system 100 on each of rails 154 of the railroad 156 and can be stored in trenched underground storage means 148, 150 on either side of the railroad 156.

Figure 6:
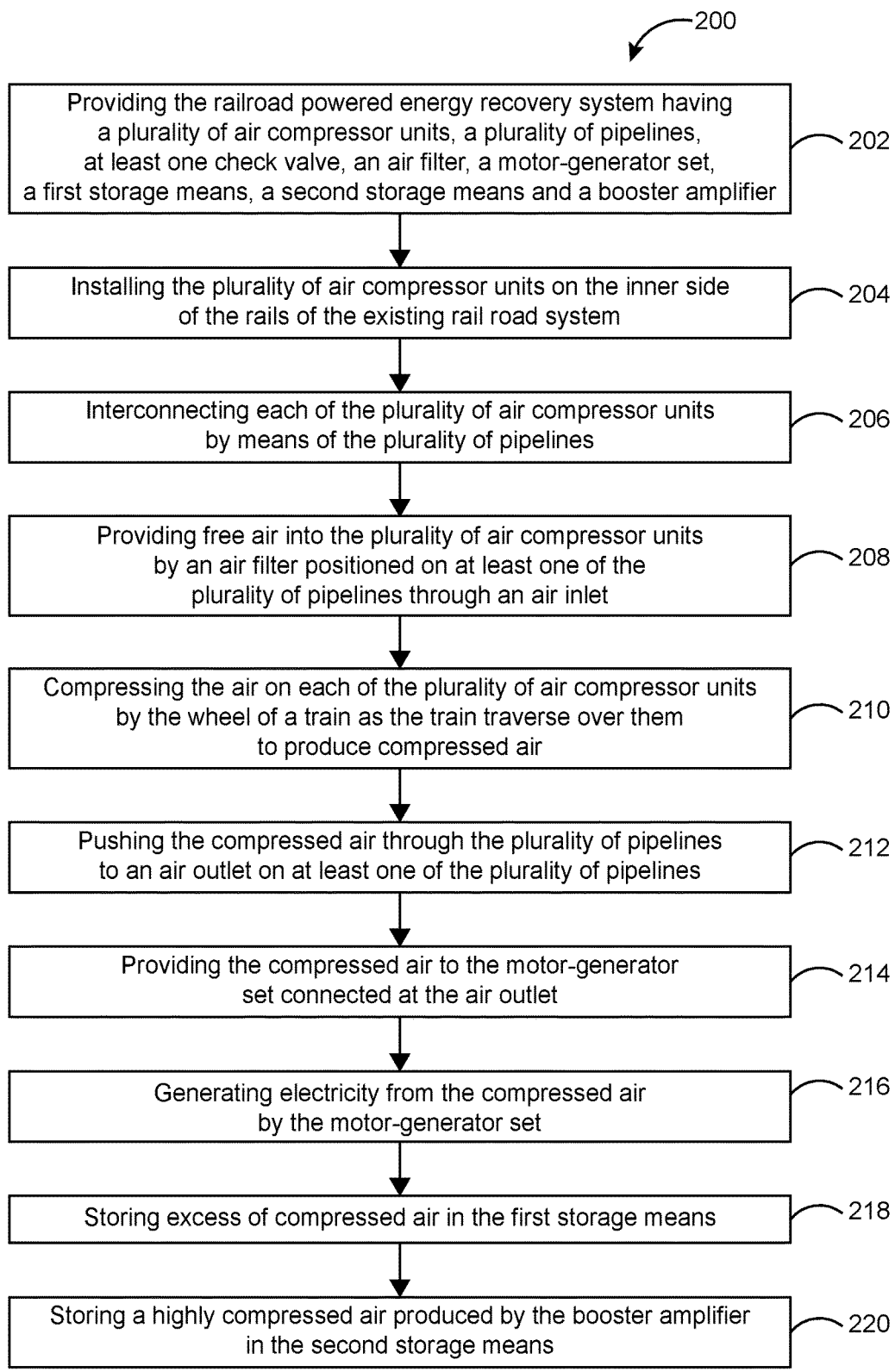
FIG. 6 illustrates a flow chart of a method for generating electricity utilizing a railroad powered energy recovery system.

FIG. 6 illustrates a flow chart of a method 200 for generating electricity utilizing a railroad powered energy recovery system. The method 200 comprises the steps of: providing the railroad powered energy recovery system having a plurality of air compressor units, a plurality of pipelines, at least one check valve, an air filter, a motor-generator set, a first storage means, a second storage means and a booster amplifier as indicated in block 202. Installing the plurality of air compressor units on the inner side of the rails of the existing railroad system as indicated in block 204. As indicated in block 206, interconnecting each of the plurality of air compressor units by means of the plurality of pipelines. Then, providing free air into the plurality of air compressor units by an air filter positioned on at least one of the plurality of pipelines through an air inlet as indicated in block 208. Compressing the air on each of the plurality of air compressor units by the wheel of a train as the train traverses over them to produce compressed air as indicated in block 210. As indicated in block 212, pushing the compressed air through the plurality of pipelines to an air outlet on at least one of the plurality of pipelines. Providing the compressed air to the motor-generator set connected at the air outlet through a T connection as indicated in block 214 and generating electricity from the compressed air by the motor-generator set as indicated in block 216. As indicated in block 218, excess compressed air is stored in the first storage means. Finally, storing highly-compressed air produced by the booster amplifier in the second storage means is indicated in block 220.

The present system 100 provides a rather large potential accumulation of compressed air volume available on-demand in the first storage means 148 and the second storage means 150. Instead of very large diesel engines, the present system 100 employs a pneumatic motor-generator set 146 that is air started and which can efficiently operate exclusively by air pressure alone. Thus, electricity can then be cleanly produced without relying on the conventional heat energy of expanding diesel fuel combustion gases to drive pistons down during engine power strokes. The energy recovery nature of the present system 100 provides sustainable, reliable on-demand massive volumes of both compressed air and from compressed air delivered to the first storage means 148 and the second storage means 150, produces power plant capacity scale amounts of clean electricity. The present system 100 eliminates the need for heat, water, sunlight, wind energy or a direct source of fossil fuel to produce electricity.

The railroad powered recovery system 100 generated electricity is capable of being delivered both for base-load or peaking demand power demands. When load spikes occur, the system 100 can rapidly throttle up and down to serve both typically separate power source types. The system 100 employs power management design techniques to manage demand with on-demand electrical power controls. Using advanced techniques like smart load sensing, the system can deliver managed electricity that can be distributed as energy that can parallel and balance daily grid supply with demand during actual real time load changes.

Moreover, the present system 100 allows liquefaction of gases like hydrogen and other volatile industrial produced gases of a variety of types utilizing the compressed air. The present system 100 eliminates the need of any other energy wasted power sources in existing industrial air gas system devices to produce most highly demanded gases. Air amplifiers can be incorporated into otherwise typical conventional gas liquefaction systems which would replace electrical motor driven compressors to more efficiently compress those same gases.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A railroad powered energy recovery system, comprising:
   a plurality of air compressor units attached to an inner side of each of the rails of an existing railroad system;
   a plurality of pipelines configured to connect each of the plurality of air compressor units, at least one of the plurality of pipelines includes an air inlet and an air outlet;
   at least one check valve configured to assure consistent direction of air flow;
   an air filter attached to the air inlet of the at least one of the plurality of pipelines;
   a motor-generator set connected to the air outlet of the at least one of the plurality of pipelines;
   at least one pressure regulator valve to control the pressure of air through the plurality of pipelines;
   a first storage means connected to the air outlet of the at least one of the plurality of pipelines to store the compressed air; and
   a second storage means connected to the first storage means through a booster amplifier, the second storage means configured to store highly compressed air from the booster amplifier;
   whereby when a train moves over the railroad, the wheels of the train compresses the plurality of air compressor units to produce compressed air which is supplied to the motor-generator set to generate electricity and the remaining compressed air is stored in the first storage means and the second storage means for industrial purposes.

2. The railroad powered energy recovery system of claim 1 wherein each of the plurality of air compressor units comprises:
   an outer casing having a lower member attached to an upper protective member to form an enclosed casing, the outer casing includes an inlet and an outlet, the lower member having an upper end and a lower end;
   a piston assembly adaptable to move upward and downward being positioned inside the outer casing, the piston assembly including a piston having a piston head and a piston shaft, a biasing member, a piston separation member and a piston cylindrical sleeve;
   a piston retaining member attached to the upper end of the lower member, the piston retaining member configured to retain the piston head within the piston cylindrical sleeve;
   a piston transition member positioned inside the outer casing to provide protection to the piston shaft;
   a piston liner member positioned between the outer casing and the piston cylindrical sleeve; and
   at least one elastic member positioned between the outer casing and the piston liner member.

3. The railroad powered energy recovery system of claim 2 wherein the upper protective member provides protection to the air compressor unit.

4. The railroad powered energy recovery system of claim 2 wherein the inlet and the outlet are configured to transfer air into and out of the air compressor unit.

5. The railroad powered energy recovery system of claim 2 wherein the piston separation member is positioned inside the piston cylindrical sleeve to prevent the piston head from hitting the piston retaining member.

6. The railroad powered energy recovery system of claim 2 wherein the piston shaft is attached to the protective member through the piston transition member.

7. The railroad powered energy recovery system of claim 2 wherein the piston separation member allows easy movement of the piston assembly and prevents the piston head from hitting the piston retaining member.

8. The railroad powered energy recovery system of claim 2 wherein the piston liner minimizes friction and protects the piston from wear and tear.

9. The railroad powered energy recovery system of claim 1 wherein the plurality of pipelines provides a path for the passage of air therethrough.

10. The railroad powered energy recovery system of claim 1 wherein the air inlet is configured to supply free air into at least one of the plurality of pipelines and the air outlet forces compressed air from at least one of the plurality of air compressor units to flow out of the only in one restricted direction through the pipeline.

11. The railroad powered energy recovery system of claim 1 wherein the air filter is configured to capture and supply free air from the atmosphere to at least one of the plurality of air compressor units.

12. A railroad powered energy recovery system to generate electricity from compressed air, the system comprising:
   a plurality of air compressor units attached to an inner side of each of the rails of an existing railroad system, each of the plurality of air compressor units comprising:
      an outer casing having a lower member attached to an upper protective member to form an enclosed casing, the outer casing including an inlet and an outlet, the lower member including an upper end and a lower end, the protective member positioned on the lower member provides protection to the air compressor unit, the inlet and the outlet are configured to transfer air into and out of the air compressor unit;
      a piston assembly adaptable to move upward and downward being positioned inside the outer casing, the piston assembly including a piston having a piston head and a piston shaft, a biasing member and a piston separation member, the biasing member attached to the piston head, the piston assembly positioned inside a piston cylindrical sleeve;
      a piston retaining member attached to the upper end of the lower member, the piston retaining member configured to retain the piston head within the piston cylindrical sleeve;
      a piston transition member positioned above the piston assembly to provide protection to the piston shaft;
      a piston liner member positioned between the outer casing and the piston cylindrical sleeve; and
      at least one elastic member positioned between the outer casing and the piston liner member;
   a plurality of pipelines configured to connect each of the plurality of air compressor units, the plurality of pipelines providing a path for the passage of air therethrough, at least one of the plurality of pipelines including an air inlet configured to supply free air into at least one of the plurality of pipelines and an air outlet forces compressed air from at least one of the plurality of air compressor units to flow out of the only in one restricted direction through the pipeline;
   at least one check valve configured to assure consistent direction of air flow;
   an air filter attached to the air inlet of at least one of the plurality of pipelines, the air filter configured to capture and supply free air from the atmosphere to at least one of the plurality of air compressor units;
   a motor-generator set connected to the air outlet of the at least one of the plurality of pipelines, the motor-generator set configured to generate electricity from compressed air;
   at least one pressure regulator valve to control the pressure of air through the plurality of pipelines;
   a first storage means connected to the air outlet of the at least one of the plurality of pipelines to store the compressed air; and
   a second storage means connected to the first storage means through a booster amplifier, the second storage means configured to store highly compressed air from the booster amplifier;
   whereby when a train moves over the railroad, the wheels of the train compress the plurality of air compressor units to produce compressed air which is supplied to the motor-generator set to generate electricity and the remaining compressed air is stored in the first storage means and the second storage means for industrial purposes.

13. The railroad powered energy recovery system of claim 12 wherein each of the plurality of air compressor units is attached to the rail utilizing an attachment means having a channel bracket connector adapter and a mounting channel iron connector.

14. The railroad powered energy recovery system of claim 12 wherein the at least one check valve is positioned between two adjacent air compressor units and allows passage of the compressed air in a single direction.

15. The railroad powered energy recovery system of claim 12 wherein the motor-generator set is a pneumatic motor-generator set that generates electricity from compressed air.

16. The railroad powered energy recovery system of claim 12 wherein the booster amplifier is supplied with compressed air stored in the first storage means to produce higher pressure compressed air which is then stored in the second storage means.

17. The railroad powered energy recovery system of claim 12 wherein each wheel of the train compresses each of the plurality of air compressor units to produce compressed air.

18. A method for generating electricity utilizing a railroad powered energy recovery system, the method comprising the steps of:
   a) providing the railroad powered energy recovery system having a plurality of air compressor units, a plurality of pipelines, at least one check valve, an air filter, a motor-generator set, a first storage means, a second storage means and a booster amplifier;
   b) installing the plurality of air compressor units on the inner side of the rails of the existing railroad system;
   c) interconnecting each of the plurality of air compressor units by means of the plurality of pipelines;
   d) providing free air into the plurality of air compressor units by an air filter positioned on at least one of the plurality of pipelines through an air inlet;

e) compressing the air on each of the plurality of air compressor units by the wheel of a train as the train traverses over them to produce compressed air;
f) pushing the compressed air through the plurality of pipelines to an air outlet on at least one of the plurality of pipelines;
g) providing the compressed air to the motor-generator set connected at the air outlet;
h) generating electricity from the compressed air by the motor-generator set;
i) storing excess of compressed air in the first storage means; and
j) storing a highly-compressed air produced by the booster amplifier in the second storage means.

* * * * *